United States Patent [19]
Novis

[11] 3,931,896
[45] Jan. 13, 1976

[54] BAR UNSCRAMBLER
[75] Inventor: Leonard Novis, Linden, Mich.
[73] Assignee: Atlas Automation, Inc., Fenton, Mich.
[22] Filed: Jan. 24, 1975
[21] Appl. No.: 543,726

[52] U.S. Cl. .............................................. 214/1 P
[51] Int. Cl.² ......................................... B65G 65/02
[58] Field of Search ................ 214/1 P, 1 PB, 1 QC; 209/74

[56] References Cited
UNITED STATES PATENTS

| | | | |
|---|---|---|---|
| 3,214,001 | 10/1965 | Callaghan | 214/1 PB X |
| 3,506,142 | 4/1970 | White | 214/1 P |
| 3,774,779 | 11/1973 | White | 214/1 PB X |

Primary Examiner—Frank E. Werner
Attorney, Agent, or Firm—Reising, Ethington, Barnard, Perry and Brooks

[57] ABSTRACT

An improved oscillating sling apparatus is disclosed for use in bar unscramblers. The oscillating sling comprises an endless chain with drive transmitting means for providing greater lineal speed of the chain at the forward or exit portion of the sling than at the rear portion. This is provided by supporting each sling chain upon sprocket wheels of equal diameter, the rear sprocket wheel shaft being at a higher elevation than the front sprocket wheel shaft. Oscillating motion is imparted to the sling by a reversible motor and speed reducer set connected with one shaft, the other shaft being coupled thereto by a drive chain and pair of sprocket wheels of a different diameter.

5 Claims, 1 Drawing Figure

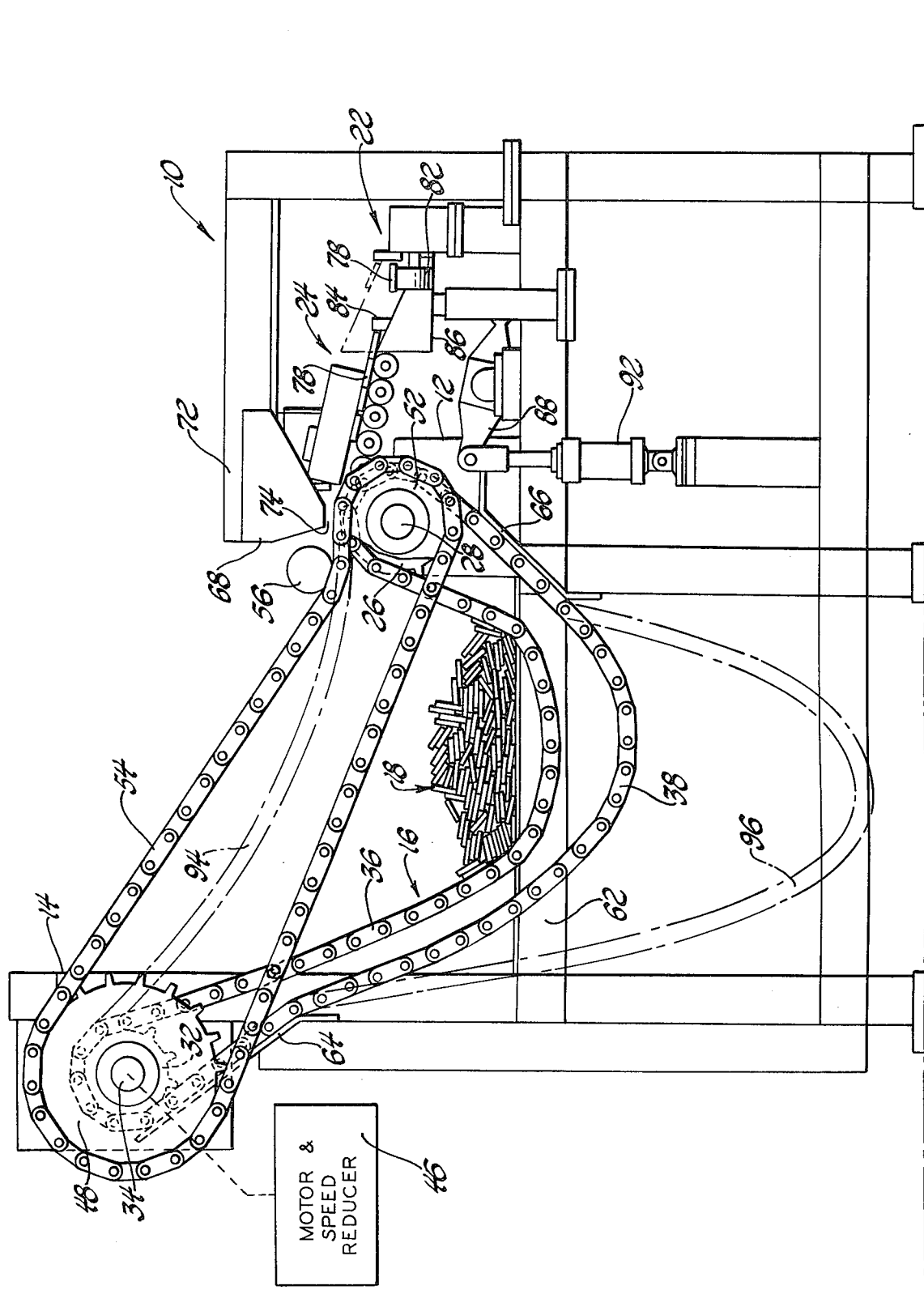

3,931,896

BAR UNSCRAMBLER

FIELD OF THE INVENTION

This invention relates to bar unscrambling and feeding apparatus and more particularly to an improved sling drive means for orienting and feeding bars from a bundle of disoriented bars. Although the description of this invention will be given with reference to an unscrambler for steel bars, the invention is applicable to pipes, rods and the like and the term "bar" is used herein to include all such workpieces.

BACKGROUND OF THE INVENTION

In many manufacturing operations, bar stock is processed to produce final piece parts; for example, bar stock may be fed automatically to shearing and heading machines to produce piece parts for springs. In this handling of the bar stock it is common practice to use a bar feeder which accepts the bar stock, one piece at a time, from a feed ramp. In supplying the feed ramp there has been a problem of automatically separating the bars from a bundle in a proper orientation to load the feed ramp. This, of course, has been done manually but a manual operation is unsatisfactory for several reasons. It has also been proposed in the prior art to automatically unscramble a bundle of bars, i.e., uniformly orient the bars in a bundle, and to feed them at a regulated rate to a transfer mechanism.

While the prior art discloses several different forms of bar unscrambling and feeding apparatus, this invention pertains to that type which is aptly described as the oscillating sling unscrambler and feeder. The oscillating sling apparatus comprises two or more slings, suitably chain slings, which form festoons and are adapted to receive a bundle of unoriented bars. The rear end of each sling is supported at a higher position than the front end and reversible drive means connected with the slings alternately shorten and lengthen the respective festoons and thereby raise and lower the bundle to orient the bars and to feed the bars, one at a time, out the front of the slings to a bar transfer means, such as a feeder ramp. Such an oscillating sling sling type unscrambling and feeding apparatus is disclosed in French Pat. no. 1,348,597 granted Dec. 2, 1963. Such an apparatus is also disclosed in the U.S. Pat. no. 3,506,142 granted Apr. 14, 1970. In the apparatus of both of the aforementioned patents the rear end of each sling is fixed and the festoon is shortened or lengthened by moving the forward end of the sling over a supporting pulley or sprocket wheel and this sling motion produces an unscrambling and feeding action of the bars.

SUMMARY OF THE INVENTION

This invention is an improvement over the aforementioned prior art in that it provides improved unscrambling and feeding action of the bars from the bundle. In accordance with the invention, this is accomplished by movable support means for both the front and rear of the slings with reversible drive means for moving the front portion of the slings faster than the rear portion. Preferably, each of the movable support means is a sprocket wheel and each of the slings comprises an endless chain looped around the sprocket wheels. Further, the front and rear sprocket wheels of each sling are of the same diameter and the reversible drive means includes drive transmitting means for rotating the front sprocket wheel faster than the rear sprocket wheel. A preferred drive transmitting means includes a driving sprocket wheel and a driven sprocket wheel of different diameters and mounted respectively on the shafts which support the sling supporting sprockets with an endless drive chain looped around the driving and driven sprocket wheels with one of the wheels drivingly connected to one of the shafts.

DETAILED DESCRIPTION OF THE INVENTION

A more complete understanding of this invention may be obtained from the detailed description that follows, taken with the accompanying drawings in which:

The single FIGURE shows the improved oscillating sling apparatus of this invention.

Referring now to the drawing, the improved oscillating sling is shown as embodied in a bar unscrambling and feeding apparatus. For the sake of simplifying the disclosure of the invention, a single oscillating sling is shown together with the drive means therefor. It will be understood, of course, that at least two oscillating slings identical to the one shown are provided in the bar unscrambling and feeding apparatus. Since this invention is an improvement upon bar unscrambling and feeding apparatus of the type shown in the aforementioned White U.S. Pat. No. 3,506,142, the entire disclosure of that patent is hereby incorporated by reference. It will be appreciated that the oscillating sling apparatus of this invention may be used in the unscrambler-feeders disclosed in the aforementioned U.S. Pat. No. 3,506,142 or French Pat No. 1,348,597 by direct substitution for the oscillating sling apparatus disclosed, respectively, therein.

The unscrambler feeder comprises a support frame 10 including a front frame member 12 and a rear frame member 14. The frame members support a plurality of slings and each sling is preferably in the form of an endless chain 16 which will be described more completely below. The slings are adapted to receive and support a bundle 18 of disoriented bars which are to be unscrambled and fed one by one to a bar feeder 22 at the front of the apparatus. A bar transfer means 24 is disposed intermediate the front of the slings and the bar feeder 22 and is adapted to transport the bars from the slings to the feeder.

The oscillating sling apparatus will now be described in detail. The endless chain 16 of each sling has its front portion supported upon a front sprocket wheel 26 which is mounted upon and keyed to a front shaft 28 journaled in the frame member 12. Similarly, the rear portion of each chain 16 is supported upon a rear sprocket wheel 32 which is mounted upon and keyed to a rear shaft 34 journaled in the rear frame member 14. The rear sprocket wheel 32 is at a higher elevation than the front sprocket wheel 26 and the wheels are of the same diameter. The chain 16 of each sling is substantially longer than that required to span the pair of sprocket wheels and hence both the upper course 36 of the chain and the lower course 38 of the chain form respective festoons between the pair of sprocket wheels. The festoons are variable in the extent of droop, i.e., they may be shortened or lengthened, dependent upon rotation of the sprockets 26 and 32, as will be discussed further below.

It is to be understood, of course, that plural slings, each identical to chain 16 and sprocket wheels 26 and 32, are supported upon the shafts 28 and 34. The number of slings will depend upon the length and weight of the bundles of bar stock and the slings are operated in unison by reversible drive means to be described presently.

The oscillating sling apparatus comprises reversible drive means which imparts a higher lineal speed to the front portion of each sling than to the rear portion. This drive means comprises a reversible motor and speed reducer set 46 which, as schematically indicated, is drivingly coupled with the rear shaft 34. A driving sprocket wheel 48 is keyed to the shaft 34 and a driven sprocket wheel 52 is keyed to the front shaft 28. The driving and driven sprocket wheels 48 and 52 are drivingly connected by an endless drive chain 54. The endless chain 54 causes the driven sprocket wheel 26 to rotate synchronously with the driving sprocket wheel 48 and is maintained under suitable tension by an idler wheel 56 in a conventional manner. The driving sprocket wheel 48 is larger than the driven sprocket wheel 52, a suitable ratio of diameter as being approximately 2 to 1, and accordingly, the front shaft 28 will rotate at a higher speed than the rear shaft 34 accordance with the ratio of diameters. The drive transmitting means as just described and comprising the driving sprocket wheel 48, driven sprocket wheel 52, and the drive chain 54 imparts oscillating motion to the slings from the reversible motor and speed reducer set 46 and it is this motion which unscrambles and feeds bars from the bundle 18 in a manner to be described presently.

Before proceeding with a description of operation of the inventive oscillating sling, it will be helpful to consider some additional structure of the unscrambling and feeding apparatus. The support frame 10 is further provided with plural horizontal frame members 62 upon which the bundle 18 rests when the slings are in a lowermost position. With the slings in this position, as is illustrated in full line in the drawing, the festoon formed by the upper course 36 of the chain has its greatset droop and the festoon formed by the lower course 38 of the chain has its smallest droop. A guide plate 64 mounted on the rear frame member 14 slidably supports the portion of the lower course 38 of the chain adjacent the rear sprocket wheel 32. Similarly, a guide plate 66 mounted on the front frame member 12 slidably supports a portion of the lower course 38 of the chain adjacent the front sprocket wheel 26.

In order to prevent jamming or piling up of the bars as they leave the slings at the front ends thereof, an antijam plate 68 is mounted on an overarm 72 of the frame 10. This anti-jame plate 68, together with the sling chain 16 passing over the front sprocket wheel 26 define an exit throat 74 of such dimension that only one bar can pass through at a time.

As noted above, the transfer means 24 accepts the bars leaving the front of the slings and transports them to the bar feeder 22. The transfer means 24 comprises a feeder ramp in the form of a set of longitudinally extending gravity rolls 76 which carry the bars 78 in succession to the bar feeder 22. The bar feeder 22 comprises a conveyor loader and a bar conveyor. The bar conveyor includes power driven magnetic rollers 82 adapted to carry an individual bar 78. The conveyor loader includes a fixed bar stop 84 in the path of the bars leaving the gravity rolls 76. A gate member 86 is reciprocally mounted on the frame 10 and is reciprocally actuated in a vertical plane by a rocker arm 88 and a lift cylinder 92, suitably of the pneumatic type. It is to be understood that the transfer means 24 and the bar feeder 22 do not, per se, constitute a part of the subject invention; other known transfer means and bar feeders may be used in conjunction with the practice of the subject invention.

In operation of the oscillating sling apparatus of this invention, the bundle 18 of bar stock may be loaded into the unscrambler-feeder by a crane or the like with the slings at rest in a position as shown in the drawing. With a bundle 18 in place the unscrambler-feeder may be started to unscramble and feed bars from the bundle, one at a time, through the exit throat 74 to transfer means 24 and thence to the bar feeder 22. With the reversible motor and speed reducer set 46 running, the driving shaft 34 will be driven alternately clockwise and counterclockwise at a regulated speed. As the driving shaft 34 rotates clockwise the driven shaft 28 will also be rotated clockwise but at a higher speed, suitably twice the speed, than the driving shaft 34 due to the difference in diameters of the driving sprocket wheel 48 and the driven sprocket wheel 52. Consequently, the lineal speed of the chain 16 on the front sprocket wheel 26 will be twice the lineal speed of the chain 16 on the rear sprocket wheel 32 due to the fact that the front and rear sprocket wheels are of the same diameter and the front sprocket wheel is rotated at twice the speed of the rear sprocket wheel. As a result of this difference in lineal speed of the front and rear portions of the chain, the festoon of the upper course 36 of the chain will shorten and rise toward the phantom line position 94; at the same time the festoon of the lower course 38 of the chain will lengthen and fall toward the phantom line position 96. This causes the bundle 18 to be elevated by the slings and the slings form a festoon which is only slightly drooping; because of the greater elevation of the rear sprocket 32, the sling chains constitute a ramp-like support for the bundle with the ramp sloping downwardly toward the front of the slings. The bars in the forward-most positions are carried toward the exit throat 74 and one bar at a time is allowed to pass by the anti-jamming blade 68. When the slings reach the upper limiting position 94, the motor is reversed and the slings are lowered to the lower limiting position with the upper course in the full line position shown. This reversing drive of the driving shaft 34 and the resulting oscillating movement of the slings is continued throughout the unscrambling and feeding operation. The motor control system, per se, for reversing the direction of rotation when the upper and lower limiting positions are reached does not constitute a part of the subject invention and may be accomplished by means well known in the art. Additionally, a reversing control may be provided which includes a jam detector, such as a pressure sensing plate, at the exit throat to cause lowering of the sling if jamming of two or more bars occurs before the sling has reached its upper limiting position. The motor control system, including the jam detector may be of the type set forth in the above-mentioned U.S. Pat. No. 3,506,142.

As set forth above, a principal feature of the subject improvement invention is that of providing an oscillating sling with a greater lineal speed at the forward or exit portion than at the rear portion; it is this feature which provides improved unscrambling and feeding of the bars from the unoriented bundle. While the preferred embodiment has been set forth herein, it will now be apparent to those skilled in the art that the invention may be carried out in other embodiments. For example, the front sprocket wheels and the rear sprocket wheels which carry the sling chains may be of different diameters with the rear sprocket wheel being the larger and with the front and rear shafts being driven at the same rotational speed from the motor and speed reducer set.

Although the description has been given with reference to a particular embodiment of the invention it is not to be construed in a limiting sense. Many variations and modifications will now occur to those skilled in the art. For a definition of the invention reference is made to the appended claims.

The embodiments of the present invention in which an exclusive property or privilege is claimed are defined as follows:

1. In a bar unscrambling and feeding apparatus of the type including a frame having longitudinally extending front and rear members spaced apart laterally and adapted to receive a bundle of unoriented bars, a plurality of flexible slings each having a front portion supported on said front member and a rear portion supported on said rear member and forming a festoon therebetween, said rear portion being at a higher position than the front portion, said slings being spaced apart longitudinally and adapted to support said bundle with the bundle extending in a generally longitudinal direction, transfer means adjacent the front member and adapted to transport a bar in a lateral direction from the front of the slings, reversible drive means for moving said slings to alternately shorten and lengthen the respective festoons and thereby raise and lower said bundle to orient said bars and feed a bar to the front of the slings, the improvement comprising: a front movable support means mounted on said front member with said front portion of the slings connected thereto, a rear movable support means mounted on said rear member with said rear portion of the slings connected thereto, said reversible drive means being connected with both of said movable support means for moving the front portion of the slings at a higher lineal speed than the rear portion of said slings whereby the slings tend to advance and retract the bundle toward and away from the transfer means when the festoons are alternately shortened and lengthened.

2. The invention as defined in claim 1 wherein each of said movable support means is a sprocket wheel and wherein each of said slings comprises an endless chain looped around the respective sprocket wheels.

3. The invention as defined in claim 2 wherein the front and rear sprocket wheels of each sling are of the same diameter, and wherein said reversible drive means includes drive transmitting means connected with said sprocket wheels for rotating the front sprocket wheel faster than said rear sprocket wheel.

4. The invention as defined in claim 3 wherein said front sprocket wheels of the plurality of slings are mounted on a front shaft and the rear sprocket wheels of the plurality of slings are mounted on a rear shaft, and wherein said drive transmitting means comprises a driving sprocket wheel on one of said shafts, a driven sprocket wheel on the other of said shafts, one of said driving and driven sprocket wheels being of larger diameter than the other, an endless drive chain looped around said driving and driven sprocket wheels, and said drive means including motor means drivingly connected with the one of said shafts on which said drive sprocket wheel is mounted.

5. The invention as defined in claim 4 wherein the smaller of the driving and driven sprocket wheels is mounted on said front shaft and the larger of said drive and driven sprocket wheels is mounted on said rear shaft.

* * * * *